United States Patent
Zhang et al.

(10) Patent No.: US 12,375,029 B2
(45) Date of Patent: Jul. 29, 2025

(54) FLOATING PHOTOVOLTAIC PLATFORM SYSTEM FOR IMPROVING OCEAN ADAPTABILITY

(71) Applicant: NANTONG INSTITUTE OF TECHNOLOGY, Jiangsu (CN)

(72) Inventors: Zhe Zhang, Jiangsu (CN); Zhilong Zhou, Jiangsu (CN)

(73) Assignee: NANTONG INSTITUTE OF TECHNOLOGY, Nantong (CN)

( * ) Notice: Subject to any disclaimer, the term of this patent is extended or adjusted under 35 U.S.C. 154(b) by 0 days.

(21) Appl. No.: 19/093,233

(22) Filed: Mar. 27, 2025

(65) Prior Publication Data
US 2025/0226790 A1   Jul. 10, 2025

Related U.S. Application Data

(63) Continuation of application No. PCT/CN2024/120665, filed on Sep. 24, 2024.

(30) Foreign Application Priority Data

Mar. 28, 2024   (CN) .......................... 202410365496.6

(51) Int. Cl.
*H02S 20/32*   (2014.01)
*B63B 35/44*   (2006.01)
*B63B 39/03*   (2006.01)

(52) U.S. Cl.
CPC ............. *H02S 20/32* (2014.12); *B63B 35/44* (2013.01); *B63B 39/03* (2013.01); *B63B 2035/4453* (2013.01)

(58) Field of Classification Search
CPC .......... H02S 20/32; B63B 35/44; B63B 39/02; B63B 2035/4453
See application file for complete search history.

(56) References Cited

U.S. PATENT DOCUMENTS

2022/0329198 A1* 10/2022 Mayer ..................... B63B 35/34

FOREIGN PATENT DOCUMENTS

| CN | 111404466 A | * | 7/2020 | ............ F24S 30/425 |
| CN | 112202398 A | * | 1/2021 | ............ B63B 35/44 |
| CN | 114560049 A | * | 5/2022 | ............ B63B 21/50 |

(Continued)

*Primary Examiner* — S. Joseph Morano
*Assistant Examiner* — Jovon E Hayes

(57) ABSTRACT

The present disclosure provides a floating photovoltaic platform system for improving ocean adaptability, including a photovoltaic platform. A plurality of peripheral floating shells are arranged below edges of the photovoltaic platform, a central floating shell is arranged below the photovoltaic platform, and the plurality of peripheral floating shells are distributed around the central floating shell; and shells of each peripheral floating shell and the central floating shell are filled with fluid substances, any two adjacent peripheral floating shells are communicated with each other through a-communication pipes, the central floating shell is communicated with the a-communication pipes through a b-communication pipe, and the internal fluid substances can be exchanged between the plurality of peripheral floating shells and the central floating shell. The self-attitude of a floating body can be changed based on buoyancy distribution.

7 Claims, 4 Drawing Sheets

(56) References Cited

FOREIGN PATENT DOCUMENTS

| CN | 116280062 A | * | 6/2023 | ............. | B63B 35/44 |
| CN | 117622404 A | * | 3/2024 | ............. | B63B 35/44 |
| CN | 118062180 A | * | 5/2024 | ............. | B63B 35/44 |
| KR | 20150051352 A | | 5/2015 | | |
| KR | 20230061806 A | | 5/2023 | | |

* cited by examiner

US 12,375,029 B2

FLOATING PHOTOVOLTAIC PLATFORM SYSTEM FOR IMPROVING OCEAN ADAPTABILITY

CROSS-REFERENCE TO RELATED APPLICATIONS

This application is a continuation of PCT/CN2024/120665, filed on Sep. 24, 2024 and claims priority of Chinese Patent Application No. 202410365496.6, filed on Mar. 28, 2024, the entire contents of which are incorporated herein by reference.

TECHNICAL FIELD

The present disclosure relates to the field of floating photovoltaic platforms.

BACKGROUND

Photovoltaic modules of a floating photovoltaic platform are usually horizontally fixed to a floating structure. Since the angle of sunlight irradiation will constantly change, if the floating body can actively adjust the attitude according to buoyancy distribution thereof, this will help to improve the light intensity received by the photovoltaic modules. At the same time, it is also necessary to consider the risk of capsizing of floating structures due to storm conditions in the marine environment.

SUMMARY

An objective of the present disclosure is to provide a floating photovoltaic platform system for improving ocean adaptability, which can change the attitude of a floating body based on buoyancy distribution, to overcome the deficiencies in the related art.

Technical solutions: to achieve the above objective, a floating photovoltaic platform system for improving ocean adaptability of the present disclosure includes a photovoltaic platform. A plurality of peripheral floating shells are arranged below edges of the photovoltaic platform, a central floating shell is arranged below the photovoltaic platform, and the plurality of peripheral floating shells are distributed around the central floating shell; and shells of each peripheral floating shell and the central floating shell are filled with fluid substances, any two adjacent peripheral floating shells are communicated with each other through a-communication pipes, the central floating shell is communicated with the a-communication pipes through a b-communication pipe, and the internal fluid substances can be exchanged between the plurality of peripheral floating shells and the central floating shell.

Further, elastic capsule bodies capable of inflating and contracting are arranged inside the peripheral floating shells, a-shell cavities are formed between outer walls of the elastic capsule bodies and inner walls of the peripheral floating shells, the a-shell cavities are communicated with the a-communication pipes, variable capsule cavities are formed inside the elastic capsule bodies, and upper ends of the peripheral floating shells are fixedly connected to conduits.

An interior of the central floating shell is a hollow b-shell cavity, a lower part of the b-shell cavity stores liquid with a liquid level higher than the b-communication pipe, the b-shell cavity is communicated with the b-communication pipe, an upper end of the central floating shell is fixedly connected to a pressure balancing pipe, and the pressure balancing pipe communicates the b-shell cavity in the central floating shell with an atmospheric environment.

Alternatively, the variable capsule cavities are filled with air, and the a-shell cavities are filled with liquid; a plurality of bidirectional air pumps are mounted on the photovoltaic platform, one end of each bidirectional air pump is communicated with an upper end of each conduit, and the other end of each bidirectional air pump is communicated with the atmospheric environment; and the bidirectional air pumps press air into the variable capsule cavities through the conduits to cause the elastic capsule bodies to be inflated, and at the same time, gas in the elastic capsule bodies can be pumped out of an outside through the conduits.

When each of the elastic capsule bodies is inflated, the a-shell cavities become smaller in volume, and the liquid in the a-shell cavities is squeezed into the b-shell cavity in the central floating shell through the a-communication pipes and the b-communication pipe communicating with each other.

Alternatively, the variable capsule cavities are filled with seawater, and the a-shell cavities are filled with air; a plurality of bidirectional water pumps are mounted on the photovoltaic platform, one end of each bidirectional water pump is communicated with the upper end of each conduit, and the other end of each bidirectional water pump is communicated with seawater in a sea area through water conduits; and the bidirectional water pumps press the seawater into the variable capsule cavities through the conduits to inflate the elastic capsule bodies.

When each elastic capsule body is inflated, the a-shell cavities become smaller in volume, the air in the a-shell cavities is squeezed into the b-shell cavity in the central floating shell through the a-communication pipes and the b-communication pipe communicating with each other, and finally is discharged to the outside through the pressure balancing pipe.

Further, a plurality of photovoltaic arrays are fixedly mounted in parallel above the photovoltaic platform through a plurality of photovoltaic brackets.

Further, the plurality of peripheral floating shells are fixedly connected to the photovoltaic platform through a plurality of a-floating shell brackets, and the central floating shell is fixedly connected to the photovoltaic platform through b-floating shell brackets.

Further, a working method of the floating photovoltaic platform system for improving ocean adaptability includes the following.

In the first example:

When the sun is biased to the direction of one or two peripheral floating shells, the bidirectional air pumps facing a direction side of the sun will gradually pump gas in the elastic capsule bodies in the peripheral floating shells facing the direction side of the sun out of an outside through the conduits, and volumes of the elastic capsule bodies in the peripheral floating shells facing the direction side of the sun are reduced; liquid originally stored in the b-shell cavity in the central floating shell is supplemented into the gradually larger a-shell cavities in the peripheral floating shells facing the direction side of the sun through the communication of the a-communication pipes and the b-communication pipe; and when encountering a storm, all the bidirectional air pumps are controlled to press air into each variable capsule cavity through each conduit to cause the elastic capsule bodies to be inflated until all the elastic capsule bodies are inflated to fully fit the inner walls of the peripheral floating shells.

In the second example:

When the sun is biased to the direction of one or two peripheral floating shells, the bidirectional water pumps facing the direction side of the sun press the seawater into the variable capsule cavities in the peripheral floating shells facing the direction side of the sun through the conduit, the elastic capsule bodies in the peripheral floating shells facing the direction side of the sun are inflated, and air in the a-shell cavities in the peripheral floating shells facing the direction side of the sun is squeezed into the b-shell cavity in the central floating shell through the communication of the a-communication pipes and the b-communication pipe.

Advantageous effects are as follows. In the "first example" and the "second example" of the present disclosure, the objective of improving the light receiving intensity of the photovoltaic arrays on the photovoltaic platform can be achieved. In particular, in the "first example", when encountering storm weather, all the peripheral floating shells become pure hollow structures, and the photovoltaic platform always spontaneously tends to be horizontal, thereby improving the overall anti-overturning ability. At the same time, after all the peripheral floating shells become pure hollow structures, the total mass of the central floating shell becomes correspondingly larger because the liquid is squeezed in, and the drainage volume of the device does not change on the whole, thereby avoiding the problem of excessive shaking caused by excessive floating of the device.

DETAILED DESCRIPTION

Figure 1:
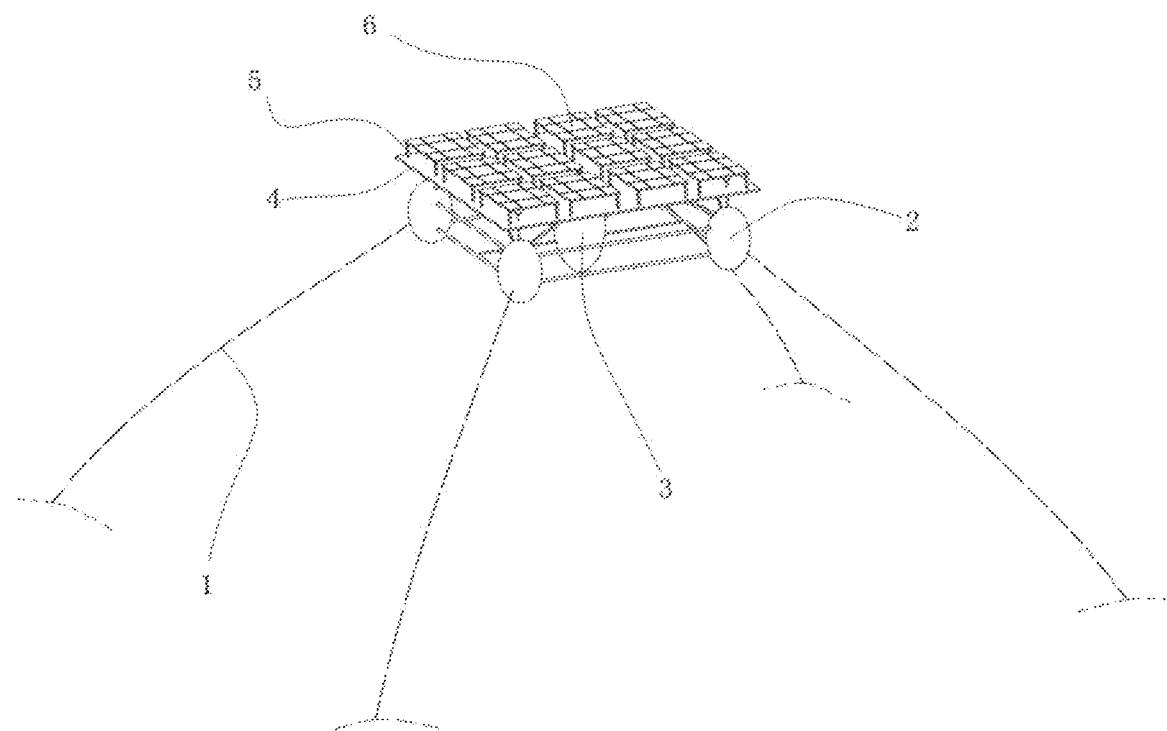
FIG. 1 is an overall schematic view of the device.
Figure 2:
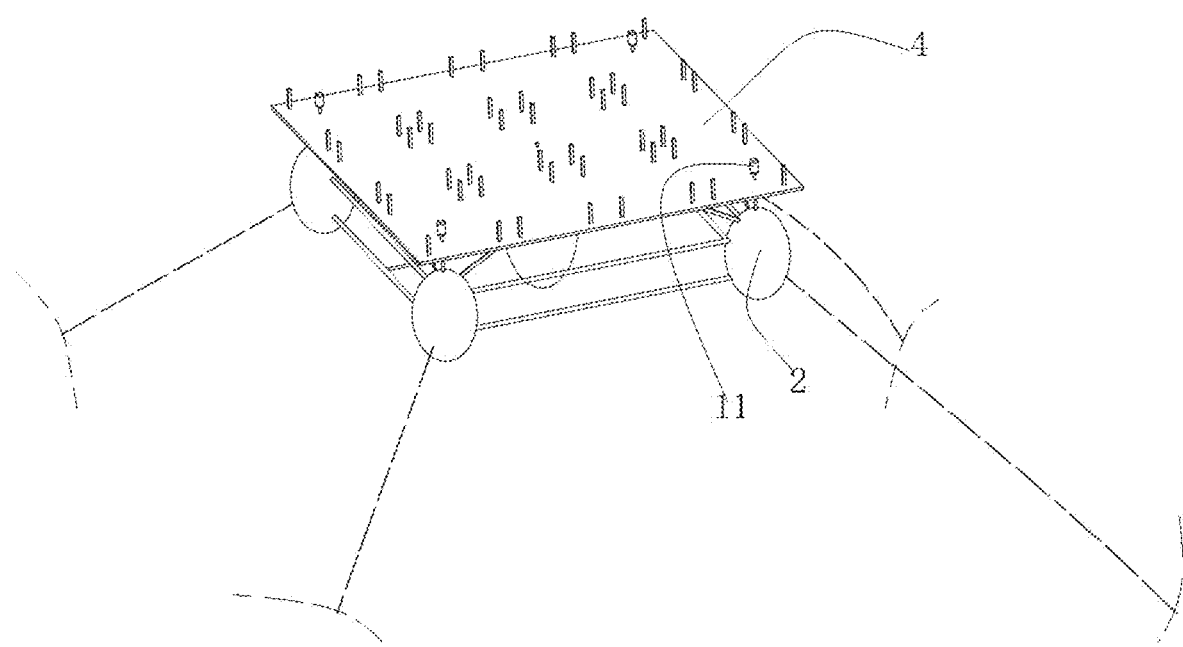
FIG. 2 is a schematic diagram after a photovoltaic array is hidden on the basis of FIG. 1.
Figure 3:
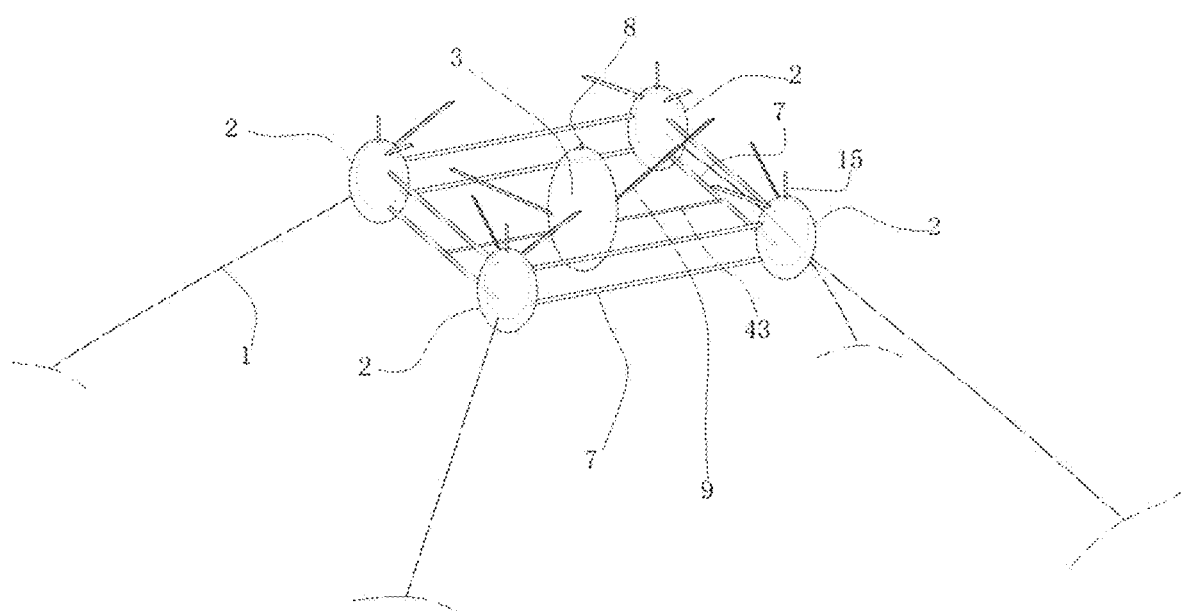
FIG. 3 is a schematic diagram after a photovoltaic platform is hidden on the basis of FIG. 2.

The present disclosure will be further described below with reference to the accompanying drawings.

As shown in FIGS. 1-5, a floating photovoltaic platform system for improving ocean adaptability includes a photovoltaic platform 4. A plurality of vertical ellipsoidal peripheral floating shells 2 are arranged below edges of the photovoltaic platform 4, a vertical ellipsoidal central floating shell 3 is arranged below a geometric center of the photovoltaic platform 4, and the plurality of peripheral floating shells 2 are distributed around the central floating shell 3 in a rectangular array. A plurality of photovoltaic arrays 6 are fixedly mounted in parallel above the photovoltaic platform 4 through a plurality of photovoltaic brackets 5. The plurality of peripheral floating shells 2 are fixedly connected to the photovoltaic platform 4 through a plurality of a-floating shell brackets 10. The central floating shell 3 is fixedly connected to the photovoltaic platform 4 through b-floating shell brackets 9. A side of each peripheral floating shell 2 away from the central floating shell 3 is connected to a flexible anchor rope 1, and the other end of one of the flexible anchor ropes 1 is connected to an anchor block on seabed.

Shells of each peripheral floating shell 2 and the central floating shell 3 are filled with fluid substances, lower parts between any two adjacent peripheral floating shells 2 are communicated with each other through a-communication pipes 7, the central floating shell 3 is communicated with the a-communication pipes 7 through a b-communication pipe 43, and the fluid substances (air or water) inside the peripheral floating shells 2 and the central floating shell 3 can be exchanged with each other. Elastic capsule bodies 14 capable of inflating and contracting are arranged inside the peripheral floating shells 2, and the elastic capsule bodies 14 can be made of industrial sealing elastic rubber or latex; a-shell cavities 12 are formed between outer walls of the elastic capsule bodies 14 and inner walls of the peripheral floating shells 2, lower parts of the a-shell cavities 12 are communicated with ends of the a-communication pipes 7, and variable capsule cavities 13 are formed in the elastic capsule bodies 14; and upper ends of the peripheral floating shells 2 are fixedly connected to conduits 15, lower ends of the conduits 15 are communicated with the variable capsule cavities 13, and each conduit 15 is arranged with an electromagnetic valve.

First Example

As shown in FIGS. 1-4, an interior of the central floating shell 3 is a hollow b-shell cavity, a lower part of the b-shell cavity stores a liquid with a liquid level higher than the b-communication pipe 43, which can be water or oil, the b-shell cavity communicates with the b-communication pipe 43, and an upper end of the central floating shell 3 is fixedly connected to a pressure balancing pipe 8, which communicates an upper end of the b-shell cavity in the central floating shell 3 with the atmospheric environment, and the air pressure of the b-shell cavity in the central floating shell 3 is always in a state consistent with the atmospheric pressure.

The variable capsule cavities 13 are filled with air, and the a-shell cavities 12 are filled with liquid. A plurality of bidirectional air pumps 11 are mounted on the photovoltaic platform 4, one end of each bidirectional air pump 11 is communicated with an upper end of each conduit 15, and the other end of each bidirectional air pump 11 is communicated with the atmospheric environment. The bidirectional air pumps 11 press air into the variable capsule cavities 13 through the conduits 15 to cause the elastic capsule bodies 14 to be inflated, and at the same time, gas in the elastic capsule bodies 14 can be extracted from the outside through the conduits 15. When each elastic capsule body 14 is inflated, the a-shell cavities 12 become smaller in volume, and the liquid in the a-shell cavities 12 is squeezed into the b-shell cavity in the central floating shell 3 through the a-communication pipes 7 and b-communication pipe 43 communicating with each other.

Working principles of the first example are as follows.

In an initial state, the size of each elastic capsule body 14 is the same, and the photovoltaic platform 4 is in a horizontal state under the buoyancy of the peripheral floating shells 2 of the same weight. When the sun is biased to the direction of one or two peripheral floating shells 2, to improve the light receiving intensity of the photovoltaic arrays 6 on the photovoltaic platform 4, the volume immersed in water of the peripheral floating shell 2 facing the direction side of the sun is increased, thereby lowering the photovoltaic platform 4 facing the direction side of the sun. Specifically, the bidirectional air pump 11 facing the direction side of the sun gradually pumps out the gas in the elastic capsule body 14 in the peripheral floating shell 2 facing the direction side of the sun through the conduit 15, the volume of the elastic capsule body 14 in the peripheral floating shell 2 facing the direction side of the sun becomes smaller, and the volume of the a-shell cavity 12 in the peripheral floating shell 2 facing the direction side of the sun becomes larger. Furthermore, the liquid originally stored in the b-shell cavity in the central floating shell 3 is supplemented to the a-shell cavity 12 in the peripheral floating shell 2 gradually increasing in the volume facing the direction side of the sun under the communication of the a-communication pipes 7 and the b-communication pipe 43, finally the total mass in the peripheral floating shell 2 facing the direction side of the sun becomes larger, and the volume immersed in water of the peripheral floating shell 2 facing the direction side of the sun becomes larger, thereby relatively lowering the photovoltaic platform 4 facing the direction side of the sun. The electromagnetic valves of the corresponding conduits 15 are closed, thereby improving the light receiving intensity of the photovoltaic arrays 6 on the photovoltaic platform 4. At the same time, the total mass in the central floating shell 3 is correspondingly reduced, which plays the role of buoyancy compensation and avoids the problem that the whole floating platform is relatively sinking.

When encountering a storm, to improve the anti-overturning ability of the photovoltaic platform 4, the liquid in all the peripheral floating shells 2 is squeezed into the central floating shell 3, and all the peripheral floating shells 2 become pure hollow structures, thereby achieving an objective of anti-overturning. Specifically, all the bidirectional air pumps 11 are controlled to inject air into the variable capsule cavities 13 through the conduits 15 to cause the elastic capsule bodies 14 to be inflated until all the elastic capsule bodies 14 are fully fit to the inner walls of the peripheral floating shells 2. Finally, the electromagnetic valves on the conduits 15 are closed, all the peripheral floating shells 2 become pure hollow structures, and the photovoltaic platform 4 always spontaneously tends to be horizontal, thereby improving the overall anti-overturning ability. At the same time, after each peripheral floating shell 2 becomes a pure hollow structure, the total mass of the central floating shell 3 increases correspondingly due to the liquid being squeezed in, and the drainage volume of the device has not changed as a whole, thereby avoiding the problem of excessive shaking caused by excessive floating of the device.

Second Example

Figure 4:
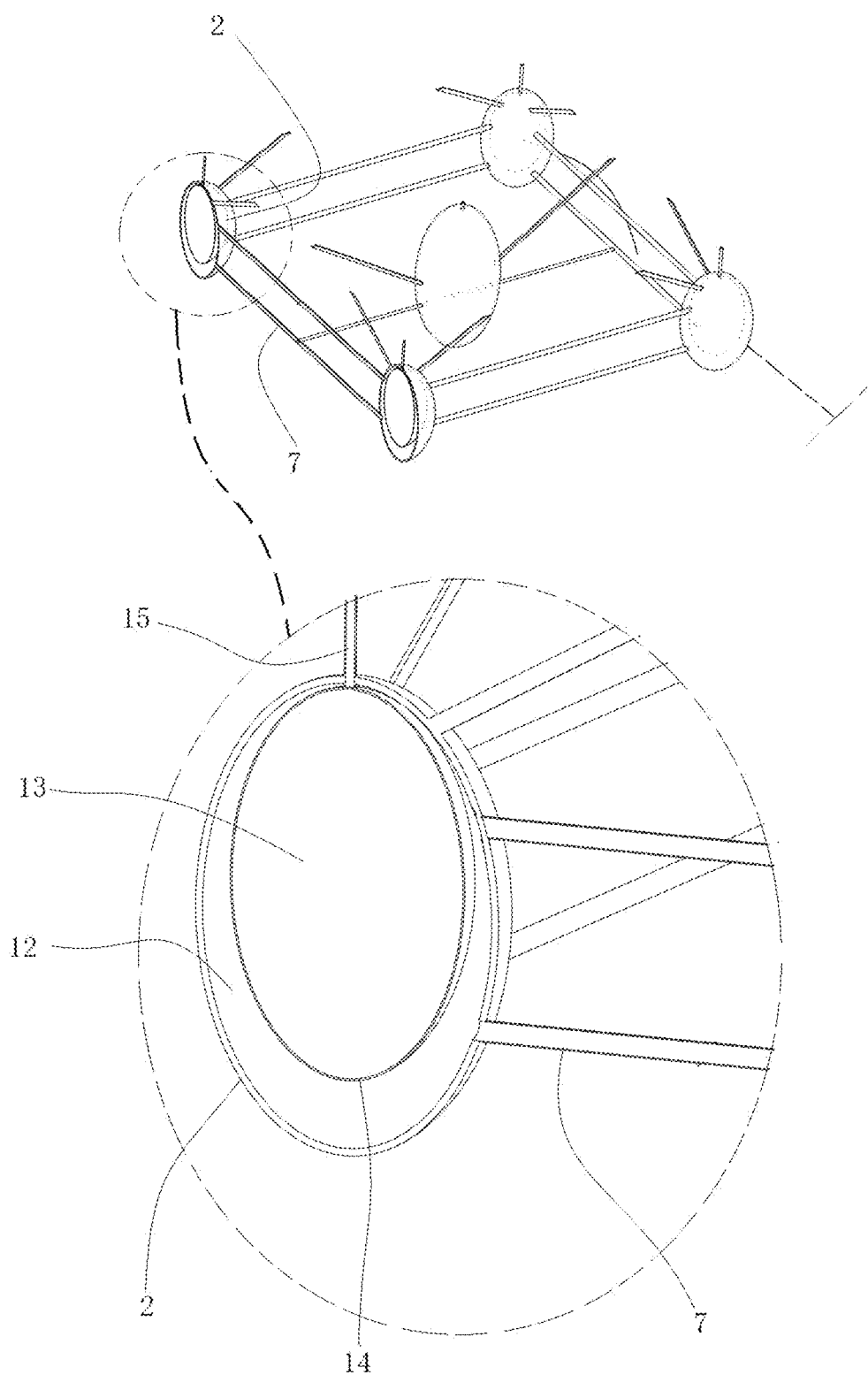
FIG. 4 is a cross-sectional view of FIG. 3.
Figure 5:
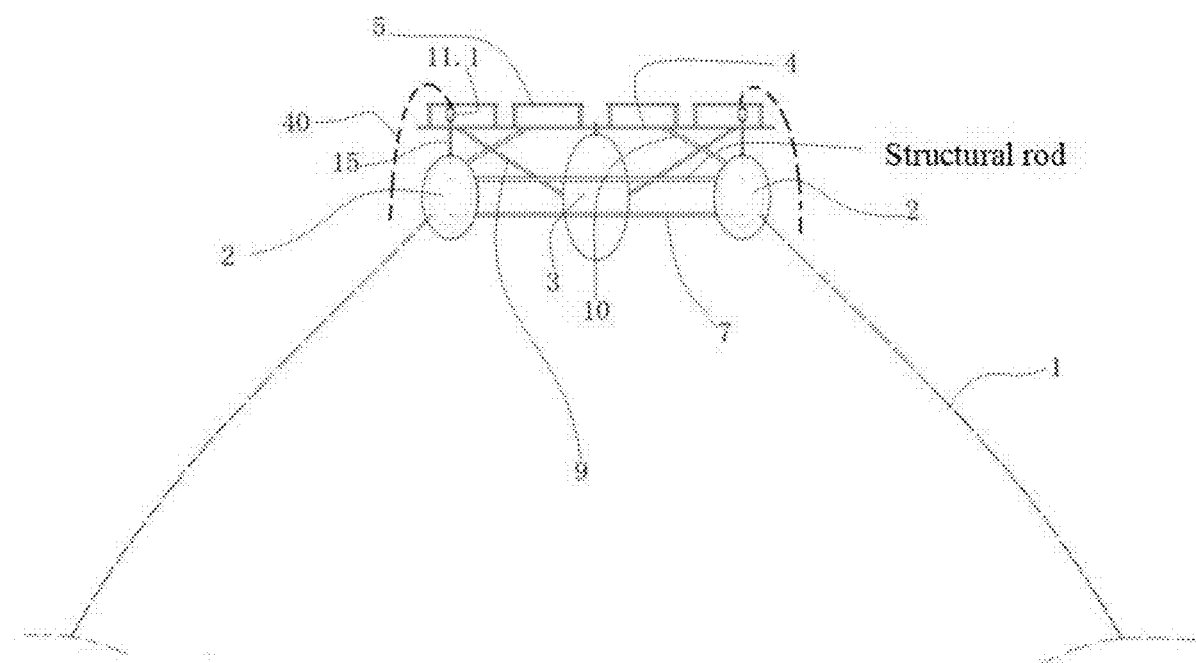
FIG. 5 is a schematic diagram of a "second example".

As shown in FIG. 4, the variable capsule cavities 13 are filled with seawater, and the a-shell cavities 12 are filled with air. As shown in FIG. 5, a plurality of bidirectional water pumps 11.1 are mounted on the photovoltaic platform 4, one end of each bidirectional water pump 11.1 is communicated with the upper end of each conduit 15, and the other end of each bidirectional water pump 11.1 is communicated with seawater in the sea area through water conduits 40. The bidirectional water pumps 11.1 press seawater into the variable capsule cavities 13 through the conduits 15 to inflate the elastic capsule bodies 14. When each elastic capsule body 14 is inflated, the a-shell cavities 12 become smaller in volume, and the air in the a-shell cavities 12 is squeezed into the b-shell cavity in the central floating shell 3 through the a-communication pipes 7 and b-communication pipes 43 communicating with each other, and finally is discharged to the outside through the pressure balancing pipe 8.

Working principles of the second example are as follows.

In an initial state, the size of each elastic capsule body 14 is the same, and the photovoltaic platform 4 is in a horizontal state under the buoyancy of the peripheral floating shells 2 of the same weight. When the sun is biased to the direction of one or two peripheral floating shells 2, to improve the light receiving intensity of the photovoltaic arrays 6 on the photovoltaic platform 4, the volume immersed in water of the peripheral floating shell 2 facing the direction side of the sun is increased, thereby lowering the photovoltaic platform 4 facing the direction side of the sun. Specifically, the bidirectional water pump 11.1 facing the direction side of the sun gradually presses seawater into the variable capsule cavity 13 in the peripheral floating shell 2 facing the direction side of the sun through the conduit 15, the elastic capsule body 14 in the peripheral floating shell 2 facing the direction side of the sun is inflated, and the air in the a-shell cavity 12 in the peripheral floating shell 2 facing the direction side of the sun is squeezed into the b-shell cavity in the central floating shell 3 through the communication of the a-communication pipes 7 and the b-communication pipe 43. Finally, the total mass in the peripheral floating shell 2 facing the direction side of the sun is increased, the photovoltaic platform 4 facing the sun position side is increased, and the volume immersed in water of the peripheral floating shell 2 facing the direction side of the sun becomes larger, thereby relatively lowering the photovoltaic platform 4 facing the direction side of the sun. The electromagnetic valves of the corresponding conduits 15 are closed, thereby improving the light receiving intensity of the photovoltaic arrays 6 on the photovoltaic platform 4.

The above is only a preferred example of the present disclosure, and it is to be pointed out that for those skilled in the art, several improvements and retouches can be made without departing from the principles of the present disclosure, and these improvements and retouches are also to be regarded as the scope of protection of the present disclosure.

The invention claimed is:

1. A floating photovoltaic platform system for improving ocean adaptability, comprising a photovoltaic platform (4), wherein a plurality of peripheral floating shells (2) are arranged below edges of the photovoltaic platform (4), a central floating shell (3) is arranged below the photovoltaic platform (4), and the plurality of peripheral floating shells (2) are distributed around the central floating shell (3); and shells of each peripheral floating shell (2) and the central floating shell (3) are filled with fluid substances, any two adjacent peripheral floating shells (2) are communicated with each other through a-communication pipes (7), the central floating shell (3) is communicated with the a-communication pipes (7) through a b-communication pipe (43), and the internal fluid substances may be exchanged between the plurality of peripheral floating shells (2) and the central floating shell (3);

elastic capsule bodies (14) capable of inflating and contracting are arranged inside the peripheral floating shells (2), a-shell cavities (12) are formed between outer walls of the elastic capsule bodies (14) and inner walls of the peripheral floating shells (2), the a-shell cavities (12) are communicated with the a-communication pipes (7), variable capsule cavities (13) are formed inside the elastic capsule bodies (14), and upper ends of the peripheral floating shells (2) are fixedly connected to conduits (15); and an interior of the central floating shell (3) is a hollow b-shell cavity, a lower part of the b-shell cavity stores liquid with a liquid level higher than the b-communication pipe (43), the b-shell cavity is communicated with the b-communication pipe (43), an upper end of the central floating shell (3) is fixedly connected to a pressure balancing pipe (8), and the pressure balancing pipe (8) communicates the b-shell cavity in the central floating shell (3) with an atmospheric environment the b-communication pipe (43).

2. The floating photovoltaic platform system for improving ocean adaptability according to claim 1, wherein the variable capsule cavities (13) are filled with air, and the a-shell cavities (12) are filled with liquid; a plurality of bidirectional air pumps (11) are mounted on the photovoltaic platform (4), one end of each bidirectional air pump (11) is communicated with an upper end of each conduit (15), and the other end of each bidirectional air pump (11) is communicated with the atmospheric environment; and the bidirectional air pumps (11) press air into the variable capsule cavities (13) through the conduits (15) to cause the elastic capsule bodies (14) to be inflated, and at the same time, gas in the elastic capsule bodies (14) may be pumped out of an outside through the conduits (15); and when each elastic capsule body (14) is inflated, the a-shell cavities (12) become smaller in volume, and the liquid in the a-shell cavities (12) is squeezed into the b-shell cavity in the central floating shell (3) through the a-communication pipes (7) and the b-communication pipe (43) communicating with each other.

3. The floating photovoltaic platform system for improving ocean adaptability according to claim 1, wherein the variable capsule cavities (13) are filled with seawater, and the a-shell cavities (12) are filled with air; a plurality of bidirectional water pumps (11.1) are mounted on the photovoltaic platform (4), one end of each bidirectional water pump (11.1) is communicated with the upper end of each conduit (15), and the other end of each bidirectional water pump (11.1) is communicated with seawater in a sea area through water conduits (40); and the bidirectional water pumps (11.1) press the seawater into the variable capsule cavities (13) through the conduits (15) to inflate the elastic capsule bodies (14); and when each elastic capsule body (14) is inflated, the a-shell cavities (12) become smaller in volume, the air in the a-shell cavities (12) is squeezed into the b-shell cavity in the central floating shell (3) through the a-communication pipes (7) and the b-communication pipe (43) communicating with each other, and finally is discharged to the outside through the pressure balancing pipe (8).

4. The floating photovoltaic platform system for improving ocean adaptability according to claim 1, wherein a plurality of photovoltaic arrays (6) are fixedly mounted in parallel above the photovoltaic platform (4) through a plurality of photovoltaic brackets (5).

5. The floating photovoltaic platform system for improving ocean adaptability according to claim 1, wherein the plurality of peripheral floating shells (2) are fixedly connected to the photovoltaic platform (4) through a plurality of a-floating shell brackets (10), and the central floating shell (3) is fixedly connected to the photovoltaic platform (4) through b-floating shell brackets (9).

6. A working method of the floating photovoltaic platform system for improving ocean adaptability according to claim 2, wherein when the sun is biased to a direction of one or two peripheral floating shells (2), the bidirectional air pumps (11) facing a direction side of the sun will gradually pump gas in the elastic capsule bodies (14) in the peripheral floating shells (2) facing the direction side of the sun out of an outside through the conduits (15), and volumes of the elastic capsule bodies (14) in the peripheral floating shells (2) facing the direction side of the sun are reduced; liquid originally stored in the b-shell cavity in the central floating shell (3) is supplemented into the gradually larger a-shell cavities (12) in the peripheral floating shells (2) facing the direction side of the sun through the communication of the a-communication pipes (7) and the b-communication pipe (43); and when encountering a storm, all the bidirectional air pumps (11) are controlled to press air into each variable capsule cavity (13) through each conduit (15) to cause the elastic capsule bodies (14) to be inflated until all the elastic capsule bodies (14) are inflated to fully fit the inner walls of the peripheral floating shells (2).

7. The working method of the floating photovoltaic platform system for improving ocean adaptability according to claim 3, wherein when the sun is biased to the direction of one or two peripheral floating shells (2), the bidirectional water pumps (11.1) facing the direction side of the sun press the seawater into the variable capsule cavities (13) in the peripheral floating shells (2) facing the direction side of the sun through the conduits (15), the elastic capsule bodies (14) in the peripheral floating shells (2) facing the direction side of the sun are inflated, and air in the a-shell cavities (12) in the peripheral floating shells (2) facing the direction side of the sun is squeezed into the b-shell cavity in the central floating shell (3) through the communication of the a-communication pipes (7) and the b-communication pipe (43).

* * * * *